United States Patent Office 3,392,318
Patented July 9, 1968

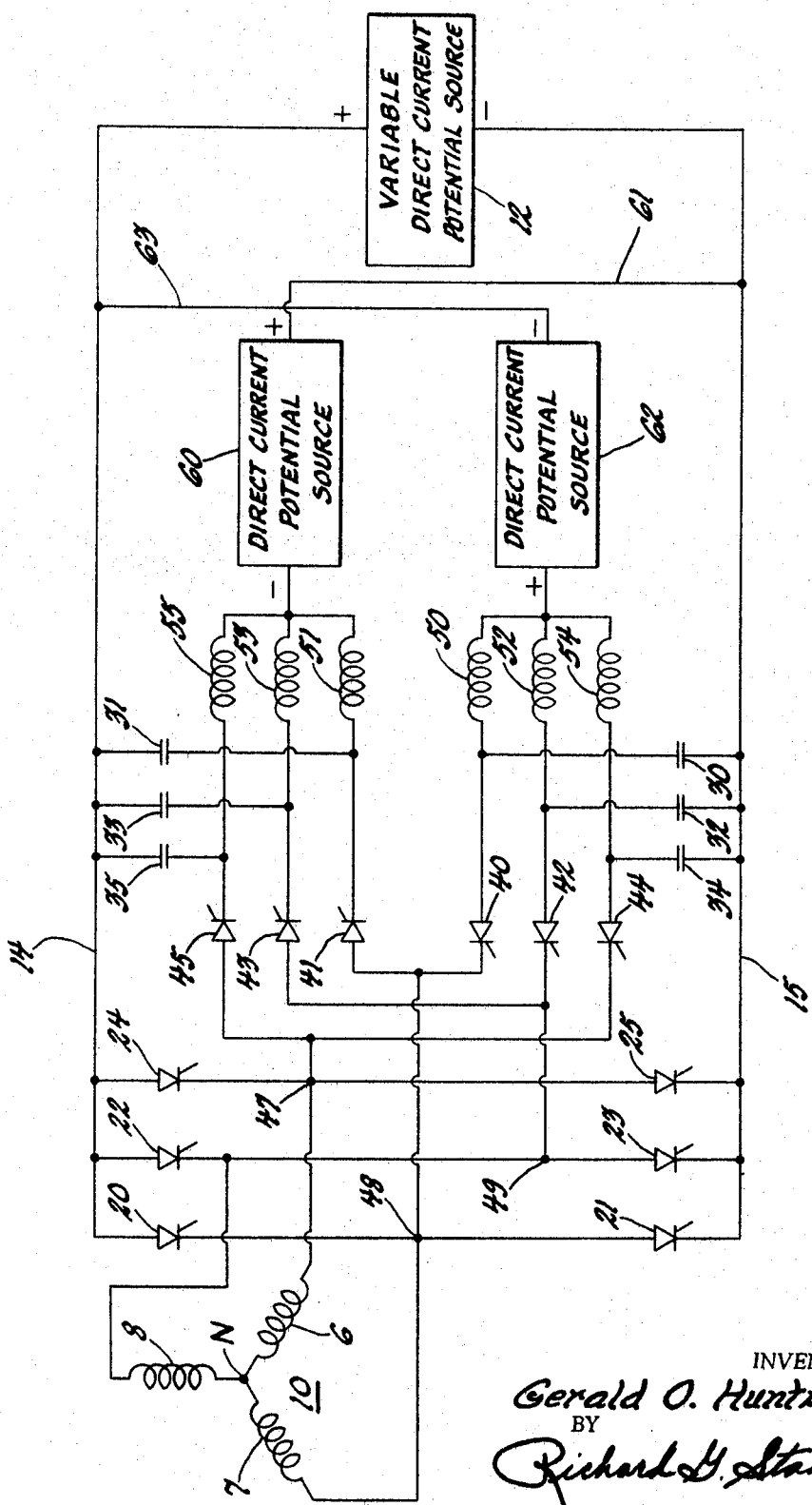

3,392,318
DIRECT CURRENT COMMUTATION SYSTEM
FOR BRUSHLESS ELECTRICAL MOTORS
Gerald O. Huntzinger, Anderson, Ind., assignor to General
Motors Corporation, Detroit, Mich., a corporation of
Delaware
Filed Oct. 21, 1965, Ser. No. 499,329
3 Claims. (Cl. 321—5)

The present invention relates to a direct current commutation system for brushless type electrical motors and, more specifically, to an electrical charge storage device charging circuit in combination with a direct current commutation system.

Recently, there has been increased activity in the development of electrical motor propulsion systems. For this application, the most desirable electrical motor is one which produces a high torque under stall and low speed conditions and which is capable of operation at very high speeds. These two requirements are somewhat contradictory, at least when considering conventional machines. The high stall torque is characteristic of direct current motors while the high speed capability is generally attainable only in alternating current motors with no brushes or commutator. An ideal propulsion motor for high speed applications would be one which has the high speed capabilities of an alternating current motor without the commutator and brush limitations inherent in direct current motors. Therefore, a logical selection would be an alternating current polyphase motor commutated as a direct current motor but without a commutator or brushes. That is, a brushless direct current commutated alternating current motor.

As is well known in the art, the armature of a direct current motor is rotated by the force produced by two interacting fields of magnetic flux which are produced by current flow through the field coils and the armature coils. In conventional machines, the magnetic poles resulting from current flow through the field coils are stationary and the magnetic poles produced by current flow through the armature coils tend to pull into alignment with the field magnetic poles. However, as the armature magnetic poles produced by current flow through any armature coil approaches alignment with the field magnetic poles, the commutator and brushes switch armature current from that coil to the next succeeding coil and the armature magnetic poles thereby produced tend to pull into alignment with the field poles. If this switching action by the commutator and brushes is performed at the proper shaft position, the armature will be rotated by the force produced as the armature poles of successive armature coils tend to pull into alignment with the field poles.

Armature or rotor rotation may also be produced by effectively rotating the magnetic poles produced by current flow through the field coils which tend to pull the poles produced by current flow through the armature coils therealong. This essentially rotating magnetic field may be produced by successively energizing the stator windings of a polyphase alternating current motor at the proper shaft positions from a direct current potential source.

One system of this type employs a polyphase alternating current induction type machine, a solid state commutation system and a triggering system which is coupled to the output shaft of the motor.

The commutation system successively energizes the stator windings of the polyphase alternating current motor at the proper shaft positions from a direct current potential source, therefore, the commutation system performs the function normally accomplished by the commutator and brushes of a direct current motor.

Most direct current commutation systems for brushless type electrical motors are comprised of at least a bridge type commutating switching circuit including a positive and a negative polarity bank of silicon controlled rectifier commutating switching devices which are connected across the positive and negative polarity terminals of the main direct current potential source and which are extinguished by electrical charges stored in corresponding electrical charge storage devices.

The electrical charge stored in each electrical charge storage device of the direct current commutation system must be supplied by the main direct current potential source, one or more auxiliary charging direct current potential sources or a combination of these two direct current potential sources. Under stall or low speed conditions, the terminal potential of the main direct current potential source may reduce to a value of insufficient magnitude to place a sufficient charge upon the electrical charge storage devices. Therefore, it is usually desirable to provide one or more auxiliary charging direct current potential sources to insure that each electrical charge storage device receives and stores an electrical charge of sufficient magnitude to positively extinguish the corresponding silicon controlled rectifier commutating switch.

In certain instances, it may be expedient to connect each auxiliary charging direct current potential source in series with the main direct current potential source in the charging circuit to supply the charge for the electrical charge storage devices.

It is therefore, an object of this invention to provide an improved direct current commutation system for brushless type electrical motors.

It is another object of this invention to provide an improved electrical charge storage device charging circuit in combination with a direct current commutation system for brushless type electrical motors.

In accordance with this invention, an improved direct current commutation system for brushless type electrical motors is provided wherein the main direct current potential source is connected in series with at least one auxiliary charging direct current potential source for placing a charge on each of a plurality of electrical charge storage devices.

For a better understanding of the present invention, together with additional objects, advantages and features thereof, reference is made to the following description and accompanying single figure drawing which sets forth in schematic form a direct current commutation system for brushless type electrical motors including the novel electrical charge storage device charging circuit of this invention.

Referring to the figure direct current power is supplied by a main direct current potential source which may be a conventional variable direct current potential source 12 connected across the positive polarity input circuit line 14 and the negative polarity input circuit line 15 of the direct current commutation system, as indicated. As the main direct current power source may be a variable direct current potential source of conventional design and forms no part of this invention, it has been shown in block form in the figure.

The stator coils 6, 7 and 8 of the motor generally shown at 10 are schematically set forth in the figure. Although stator coils 6, 7 and 8 have been indicated in the figure to be connected in a Y configuration, it is to be specifically understood that the novel commutation system of this invention is equally applicable to stator coils connected in a delta configuration. The coils 6, 7 and 8 are not to be construed as single coils but as a schematic representation of all coils included in the respective phases.

Throughout the specification, the end of each of coils 6, 7 and 8 which is not connected to the electrical neutral point N will be referred to as the terminal end.

To properly energize coils 6, 7 and 8, a bridge type commutating switching circuit, having a positive and a negative polarity bank of silicon controlled rectifier commutating switching devices is provided and is connected across input circuit lines 14 and 15. In the figure, this bridge type commutating switching circuit comprises silicon controlled rectifiers 20, 21, 22, 23, 24 and 25.

The silicon controlled rectifier is a semi-conductor device having a control electrode, generally termed the gate electrode, and two current carrying electrodes, generally referred to as the anode and cathode electrodes, which is designed to normally block current flow in either direction. With the anode and cathode electrodes forward poled, anode positive and cathode negative, the silicon controlled rectifier may be triggered to conduction upon the application, to the control electrode, of a control potential signal of a polarity which is positive in respect to the potential present upon the cathode electrode and of sufficient magnitude to produce control electrode-cathode, or gate, current. In the conducting state, the silicon controlled rectifier will conduct current in one direction and retains the ability to block current flow in the opposite direction. Upon being triggered to conduction, however, the control electrode is no longer capable of affecting the device, which will remain in the conducting state until either the anode-cathode circuit is interrupted or the polarity of the potential applied across the anode-cathode electrodes is reversed. Of these two alternatives, the reversal of the polarity of the potential across the anode-cathode electrodes thereof is perhaps the most satisfactory.

Included in the positive polarity bank of the commutating switching circuit are the three silicon controlled rectifier commutating switches having the anode electrodes connected to positive polarity input circuit line 14 and included in the negative polarity bank of this switching circuit are the three silicon controlled rectifier commutating switches having the cathode electrodes connected to the negative polarity input circuit line 15. That is, silicon controlled rectifier commutating switches 20, 22 and 24 comprise the positive polarity bank of commutating switches and silicon controlled rectifier commutating switches 21, 23 and 25 comprise the negative polarity bank of commutating switches.

Corresponding to each one of the silicon controlled rectifier commutating switches of the bridge type commutating switching circuit is an electrical charge storage device in which an electrical charge may be stored and which may be used to extinguish the corresponding silicon controlled rectifier commutating switch.

These electrical charge storage devices have been shown in the figure as capacitors 30, 31, 32, 33, 34 and 35 which correspond to respective silicon controlled rectifier commutating switches 20, 21, 22, 23, 24 and 25 of the commutating switching circuit.

To charge the capacitors corresponding to those silicon controlled rectifier commutating switches included in the positive polarity bank of commutating switches in the commutating switching circuit is a first charging circuit including the series combination of the main direct current potential source 12 and an auxiliary charging direct current potential source 62. To charge the capacitors corresponding to those silicon controlled rectifier commutating switches included in the negative polarity bank of commutating switches of the commutating switching circuit is a second charging circuit including the series combination of the main direct current potential source 12 and another auxiliary charging source of direct current potential 60. As these auxiliary charging direct current potential sources may be of conventional design and form no part of this invention, they have been shown in block form in the figure. The negative polarity terminal of source 62 is connected to the positive polarity terminal of main source 12 through lead 63 and the positive polarity terminal of source 60 is connected to the negative polarity terminal of main source 12 through lead 61.

Those capacitors corresponding to the commutating switching devices included in the positive polarity bank of the bridge type commutating switching circuit are connected in parallel across the series combination of the main direct current potential source and the corresponding auxiliary charging direct current potential source. Those capacitors corresponding to the commutating switching devices included in the negative polarity bank of the bridge type commutating switching circuit are connected in parallel across the series combination of the main direct current potential source and the other auxiliary charging direct current potential source.

Capacitors 30, 32 and 34, corresponding to respective silicon controlled rectifier commutating switches 20, 22 and 24 included in the positive polarity bank of commutating switches in the commutating switching circuit, are connected in parallel across the series combination of direct current potential sources 62 and 12 through respective series charging inductors 50, 52 and 54. Capacitors 31, 33 and 35, corresponding to respective silicon controlled rectifier commutating switches 21, 23 and 25 included in the negative polarity bank of commutating switches in the commutating switching circuit, are connected in parallel across the series combination of direct current potential sources 60 and 12 through respective series charging inductors 51, 53 and 55.

To substantially double the charge upon each capacitor compared to the source supplying it, an inductor element is included in the charging circuitry to provide a resonant circuit.

The electrical charge on capacitors 30, 31, 32, 33, 34 and 35 must be of a sufficient magnitude to extinguish the corresponding silicon controlled rectifier commutating switches, this magnitude being determined by the current flowing through these switches, and, in any event, this charge must be of a magnitude greater than the potential of main direct current potential source 12 at all times. Therefore, auxiliary direct potential sources 60 and 62 must be selected to have a potential of a magnitude which will satisfy the two requirements. With the series inductors included in the charging circuit of each capacitor, the magnitude of the charge upon these devices may be as much as 1.8 times supply potential.

So that each silicon controlled rectifier commutating switch may be selectively extinguished, provision is made for selectively diverting the current flowing through the anode-cathode electrodes of each silicon controlled rectifier commutating switch of the commutating switching circuit toward the opposite power supply line. To establish a diverting circuit, there is provided a controllable extinguishing switching device, of the type having at least two current carrying electrodes and a control electrode, and being of the type which, when forward poled, may be triggered to conduction upon the application of a proper polarity signal pulse to the control electrode thereof, corresponding to each silicon controlled rectifier commutating switch.

These controllable extinguishing switching devices are indicated in the figure as silicon controlled rectifier extinguishing switches 40, 41, 42, 43, 44 and 45 which correspond to respective silicon controlled rectifier commutating switches 20, 21, 22, 23, 24 and 25.

Each commutating switching device, the corresponding electrical charge storage device and the corresponding extinguishing switching device are interconnected in such a manner that the current flowing through each silicon controlled rectifier commutating switch is diverted toward the opposite supply line when the corresponding extinguishing switching device is triggered to conduction. Specifically, the series combination of a capacitor and the anode-cathode electrodes of a silicon controlled rectifier extinguishing switch is connected between the anode electrode of each silicon controlled rectifier in the negative polarity bank and the positive polarity power supply line and between the cathode electrode of each silicon controlled rectifier in the positive polarity bank and the negative polarity power supply line. In the figure, for example, the series combination of capacitor 35 and the anode-cathode electrodes of silicon controlled rectifier extinguishing switch 45 is connected between the anode electrode of silicon controlled rectifier commutating switch 25 and positive polarity supply line 14.

The triggering system, previously mentioned, relates the switching action of the commutation system to shaft position, as does the commutator in a conventional direct current motor, and produces electrical switching signal pulses at the proper motor shaft positions to trigger to conduction at each shaft position the proper silicon controlled rectifier commutating switch which will complete an energizing circuit from main direct current power source 12 to the corresponding stator coils of motor 10 and to trigger to conduction the proper silicon controller rectifier extinguishing switch at each shaft position to complete the extinguishing circuit previously described to extinguish the proper conducting silicon controlled rectifier commutating switch. For example, assuming that the motor 10 is running and that silicon controlled rectifier commutating switches 24 and 21 are conducting, stator coils 6 and 7 are energized through a circuit which may be traced from positive polarity input circuit line 14 through conducting silicon controlled rectifier commutating switch 24, motor windings 6 and 7 and conducting silicon controlled rectifier commutating switch 21 to negative polarity input circuit line 15. At the next motor shaft position at which it is necessary to energize another stator coil pair, the triggering system produces, substantially simultaneously a switching signal pulse which will trigger silicon controlled rectifier commutating switch 22 to conduction and a switching signal pulse which will trigger silicon controlled rectifier extinguishing switch 44 to conduction.

As silicon controlled rectifier extinguishing switch 44 begins conducting, current flow therethrough rapidly increases from the positive polarity plate of capacitor 34 through motor coils 6 and 7 and conducting silicon controlled rectifier commutating switch 21 to negative polarity input circuit line 15. As the flow through conducting silicon controlled rectifier extinguishing switch 44 increases, there is a corresponding rapid decrease of current flow through silicon controlled rectifier commutating switch 24.

The current flow through conducting silicon controlled rectifier 44 results in a potential at junction 47 which becomes increasingly more positive. As the positive polarity plate of capacitor 34 is more positive than positive polarity input circuit line 14, current tends to flow in a reverse direction through silicon controlled rectifier commutating switch 24 from junction 47 toward positive polarity input circuit line 14. This reverse current through conducting silicon controlled rectifier commutating switch 24 quickly extinguishes this device.

At the next motor shaft position at which it is necessary to energize another stator coil pair, the triggering system produces, substantially simultaneously, a switching signal pulse which will trigger silicon controlled rectifier commutating switch 25 to conduction and a switching signal pulse which will trigger silicon controlled rectifier extinguishing switch 41 to conduction.

As silicon controlled rectifier extinguishing switch 41 begins conducting, current flow therethrough rapidly increases into the negative polarity plate of capacitor 31 through conducting silicon controlled rectifier commutating switch 22 and motor coils 8 and 7. As the flow through conducting silicon controlled rectifier extinguishing switch 41 increases, there is a corresponding rapid decrease of current flow through silicon controlled rectifier commutating switch 21.

The current flow through conducting silicon controlled rectifier 41 results in a potential at junction 48 which becomes increasingly more negative. As the negative polarity plate of capacitor 31 is more negative than negative polarity supply line 15, current tends to flow in a reverse direction through silicon controlled rectifier commutating switch 21 from negative polarity supply line 15 toward junction 48 and positive polarity input circuit line 14. This reverse current through conducting silicon controlled rectifier commutating switch 21 quickly extinguishes this device.

At the next motor shaft position at which it is necessary to energize another stator coil pair, the triggering system produces, substantially simultaneously, a switching signal pulse which will trigger silicon controlled rectifier commutating switch 20 to conduction and a switching signal pulse which will trigger silicon controlled rectifier extinguishing switch 42 to conduction.

As silicon controlled rectifier extinguishing switch 42 begins conducting, current flow therethrough rapidly increases from the positive polarity plate of capacitor 32 through motor coils 8 and 6 and conducting silicon controlled rectifier commutating switch 25 to negative polarity input circuit line 15. As the flow through conducting silicon controlled rectifier extinguishing switch 42 increases, there is a corresponding rapid decrease of current flow through silicon controlled rectifier commutating switch 22.

The current flow through conducting silicon controlled rectifier 42 results in a potential at junction 49 which becomes increasingly more positive. As the positive polarity plate of capacitor 32 is more positive than positive polarity input circuit line 14, current tends to flow in a reverse direction through silicon controlled rectifier commutating switch 22 from junction 49 toward positive polarity input circuit line 14. This reverse current through conducting silicon controlled rectifier commutating switch 22 quickly extinguishes this device.

This action may be traced through a complete cycle and it is apparent that the combination of the triggering system and the commutating switching system operates to energize successive coil pairs, thereby producing a substantially rotating magnetic field in the stator windings of motor 10.

As the triggering system performs no part of this invention, it has not been set forth in detail in this specification. It is only necessary that a triggering system which, in combination with the commutating switching system set forth in the figure, will produce the necessary switching signals to provide for the energization of successive stator coil pairs and to extinguish the proper commutating switches, as has been briefly described in the next paragraph above, be employed.

As the extinguishing charge upon each capacitor is dissipated upon the conduction of the corresponding silicon controlled rectifier extinguishing switch, as previously described, another extinguishing charge is supplied through the charging circuitry. For example, the extinguishing charge upon capacitor 34, which is dissipated upon the conduction of silicon controlled rectifier extinguishing switch 44, is replaced through the charging circuit including main direct current potential source 12 and auxiliary charging direct current potential source 62 connected in series through lead 63, inductor 54, capacitor 34 and negative input circuit line 15. Similarly, the extinguishing charge upon capacitor 31, which is dissipated upon the conduction of silicon controlled rectifier extinguishing switch 41, is replaced through the charging circuit including main direct current potential source 12 and auxiliary charging direct current potential source 60 connected in series through lead 61, inductor 51, capacitor 31 and positive input circuit line 14.

Specific charging circuits may be similarly traced for each of the remaining capacitors 30, 32, 33 and 35. From this description it is apparent that the extinguishing charge upon each capacitor is supplied by the series combination of the main direct current potential source and the corresponding auxiliary charging direct current potential source.

In prior commutation systems of this type, each of auxiliary charging batteries 60 and 62 should supply a potential of a magnitude substantially greater than the terminal potential of main battery 12 to insure that each of the extinguishing capacitors receives a charge of sufficient magnitude to extinguish the corresponding silicon controlled rectifier extinguishing switch at all times. The novel extinguishing capacitor charging circuitry of this invention permits the use of auxiliary charging direct current sources of considerably lower potential rating, as most of the required charging energy is supplied by the main direct current potential source, and the use of constant potential auxiliary charging sources with a variable main potential source.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. In a direct current commutation system for brushless type electrical motors comprising at least a bridge type commutating switching circuit including a positive and a negative polarity bank of silicon controlled rectifier commutating switching devices connected across the positive and negative polarity terminals of a main direct current potential source and a plurality of electrical charge storage devices, each corresponding to one of said commutating switching devices, for storing an electrical charge, the combination with said electrical charge storage devices of first and second auxiliary charging direct current potential sources each having positive and negative polarity terminals, first charging circuit means including the series combination of said main direct current potential source and one of said auxiliary charging direct current potential sources for charging those said electrical charge storage devices corresponding to the said commutating switching devices included in said positive polarity bank and second charging circuit means including the series combination of said main direct current potential source and the other one of said auxiliary charging direct current potential sources for charging those said electrical charge storage devices corresponding to the said commutating switching devices included in said negative polarity bank.

2. The direct current commutation system as described in claim 1 wherein those said electrical charge storage devices corresponding to the said commutating switching devices included in said positive polarity bank are connected in parallel across either one of said charging circuit means and those said electrical charge storage devices corresponding to the said commutating switching devices included in said negative polarity bank are connected in parallel across the other one of said charging circuit means.

3. The direct current commutation system as described in claim 1 wherein the negative polarity terminal of one of said auxiliary charging direct current potential sources is connected to the positive polarity terminal of said main direct current potential source, the positive polarity terminal of the other one of said auxiliary charging direct current potential sources is connected to the negative polarity terminal of said main direct current potential source, those said electrical charge storage devices carresponding to the said commutating switching devices included in said positive polarity bank are connected in parallel across the series combination of said one of said auxiliary charging direct current potential sources and said main direct current potential source and those said electrical charge storage devices corresponding to the said commutating switching devices included in said negative polarity bank are connected in parallel across the series combination of the said other one of said auxiliary charging direct current potential sources and said main direct current potential source.

References Cited

UNITED STATES PATENTS

| 3,213,287 | 10/1965 | King | 321—45 XR |
| 3,262,036 | 7/1966 | Clarke et al. | 318—227 |
| 3,340,453 | 9/1967 | Bradley et al. | 321—5 |
| 3,354,370 | 11/1967 | Corry et al. | 318—227 |

LEE T. HIX, *Primary Examiner.*

W. M. SHOOP, *Assistant Examiner.*